(12) United States Patent
Birnbaum et al.

(10) Patent No.: US 11,828,211 B2
(45) Date of Patent: Nov. 28, 2023

(54) METHOD FOR OPERATING AN ACTIVE OIL SEPARATOR AND DEVICE FOR SEPARATING OIL

(71) Applicant: Volkswagen Aktiengesellschaft, Wolfsburg (DE)

(72) Inventors: Sven Birnbaum, Jembke (DE); Axel Wachtendorf, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 49 days.

(21) Appl. No.: 17/675,053

(22) Filed: Feb. 18, 2022

(65) Prior Publication Data
US 2022/0170395 A1 Jun. 2, 2022

Related U.S. Application Data

(63) Continuation of application No. PCT/EP2020/070063, filed on Jul. 15, 2020.

(30) Foreign Application Priority Data

Aug. 19, 2019 (DE) ..................... 10 2019 212 394.5

(51) Int. Cl.
*F01M 11/10* (2006.01)
*F01M 13/04* (2006.01)

(52) U.S. Cl.
CPC ............ *F01M 11/10* (2013.01); *F01M 13/04* (2013.01); *F01M 2013/0422* (2013.01); *F01M 2250/60* (2013.01); *F01M 2250/64* (2013.01)

(58) Field of Classification Search
CPC ........... F01M 2250/64; F01M 2250/60; F01M 2013/0422; F01M 13/04; F01M 11/10
See application file for complete search history.

(56) References Cited

U.S. PATENT DOCUMENTS

| 7,377,271 B2 | 5/2008 | Hoffmann et al. |
| 9,243,528 B2 | 1/2016 | Skoog |
| (Continued) | | |

FOREIGN PATENT DOCUMENTS

| DE | 20302824 U1 | 7/2004 |
| DE | 10323261 A1 | 12/2004 |
| (Continued) | | |

OTHER PUBLICATIONS

International Search Report dated Oct. 15, 2020 in corresponding application PCT/EP2020/070063.

*Primary Examiner* — Kevin A Lathers
(74) *Attorney, Agent, or Firm* — Muncy, Geissler, Olds & Lowe, P.C.

(57) ABSTRACT

A method for operating an active oil separator for separating oil from exhaust air of a crankcase of a motor vehicle with an internal combustion engine. An engine operating state of the internal combustion engine is detected. A first SET rotational speed of the oil separator is determined as a function of the detected engine operating state and a first characteristic map. A maximum SET rotational speed of the oil separator is determined as a function of the first SET rotational speed by the determination device. A preferred SET rotational speed is determined on the basis of the maximum SET rotational speed by a determination device. An electric motor is controlled to drive the oil separator at the preferred SET rotational speed by a control device. A device is also provided for separating oil from exhaust air of a crankcase of a motor vehicle with an internal combustion engine.

9 Claims, 6 Drawing Sheets

(56) References Cited

U.S. PATENT DOCUMENTS

| | | | |
|---|---|---|---|
| 11,097,285 B2 * | 8/2021 | Kuhn | ............... F01M 13/04 |
| 11,098,623 B2 | 8/2021 | Erdmann et al. | |
| 2003/0233932 A1 | 12/2003 | Ekeroth | |
| 2011/0180052 A1 | 7/2011 | Schwandt et al. | |
| 2013/0233290 A1 * | 9/2013 | Skoog | ............... F01M 13/04 |
| | | | 123/572 |
| 2020/0147623 A1 | 5/2020 | Roelver et al. | |

FOREIGN PATENT DOCUMENTS

| | | |
|---|---|---|
| DE | 102012014474 A1 | 1/2014 |
| DE | 102013226610 A1 | 6/2015 |
| DE | 102015205557 B4 | 5/2017 |
| DE | 202016104754 U1 | 12/2017 |
| DE | 202016104755 U1 | 12/2017 |
| DE | 102017108281 A1 | 10/2018 |
| DE | 102017111479 A1 | 11/2018 |
| DE | 102017211979 A1 | 1/2019 |
| EP | 2616645 B1 | 2/2017 |
| EP | 3591180 A1 * | 1/2020 ............. B04B 13/00 |

\* cited by examiner

METHOD FOR OPERATING AN ACTIVE OIL SEPARATOR AND DEVICE FOR SEPARATING OIL

This nonprovisional application is a continuation of International Application No. PCT/EP2020/070063, which was filed on Jul. 15, 2020, and which claims priority to German Patent Application No. 10 2019 212 394.5, which was filed in Germany on Aug. 19, 2019, and which are both herein incorporated by reference.

BACKGROUND OF THE INVENTION

Field of the Invention

The present invention relates to a method for operating an active oil separator and a device for separating oil.

Description of the Background Art

In motor vehicles with an internal combustion engine, gases can escape into the crankcase on account of the combustion process as well as high pressures at the contact point between the piston ring and the liner of the cylinder. These gases are therefore also referred to as "blow-by gases" or "BB gases." Within the framework of the invention, the blow-by gases are referred to as "exhaust air." During operation of the internal combustion engine, the blow-by gases accumulate in the crankcase, and therefore must be evacuated from the crankcase. This takes place through appropriately designed vent lines. The evacuated blow-by gases can subsequently be mixed with fresh air and returned to the cylinders for the combustion process. The blow-by gases are fed into the combustion air directly in the intake manifold or in the compressor, for example.

It is a problem here that blow-by gases often also have accumulations of fuel residues, water, and oil in addition to the usual combustion gases. The amount of oil, in particular, in blow-by gas can lead to problems for combustion in the cylinder. The oil is present in blow-by gas in the form of tiny oil droplets. In the combustion process, these oil droplets cause the formation of hydrocarbon emissions and particulates, in particular ash. Moreover, the oil droplets contribute to fouling of the intake valves of the internal combustion engine so that wear of the intake valves is increased.

To avoid these disadvantages, oil separators are used that form a section of the vent line. Blow-by gas conducted out of the crankcase is conducted into the oil separator, and the oil is separated out of the blow-by gas by a filtering device of the oil separator. Known filtering devices for separating oil have disks, for example, which are often combined into disk stacks. The oil droplets striking the disks can stick to the disks and be collected while forming larger drops. The oil that is thus separated out of the blow-by gas can be conducted back into the crankcase, for example. Oil separation by means of such oil separators fills an important function in both exhaust gas reduction and engine protection.

Conventional oil separators generally have a rigid or a passive filter system. A rigid filter system is understood to mean a filter system in which the filtering device is designed to be rigid relative to the vent line so that no motion relative to the vent line occurs in operation. Such filter systems have fixed filter plates, for example, against which blow-by gas can flow at a predefined angle of incidence in order to deposit the oil droplets on the filter plates. In the case of passive filter systems, the filtering devices are designed to be movable, in particular rotatable, wherein the passive filter system does not have a separate drive device. The filter device can be driven by the gas flow of the blow-by gas, a lubricant flow of a lubricant, or the like, for example. Such a filter system is known from, for example, DE 10 2013 226 610 A1, which is incorporated herein by reference.

The continuing tightening of legally prescribed limit values for emissions, such as the SULEV 20 legislation, for example, has raised the requirements for oil separation by generic crankcase ventilation systems, among other things. Conventional rigid or passive filter systems do not satisfy these requirements, since they cannot ensure adequate oil separation for system-related reasons. In other words, it is not possible to ensure with these filter systems that the oil content of the filtered blow-by gas does not exceed a maximum permissible limit value. For this reason, increasing use is being made of oil separators with active filter systems.

In an active filter system, the filtering devices are driven, in particular set in rotation, by a separate electric motor, in particular an electric motor that can be controlled independently of the operating state of the internal combustion engine. One common embodiment of an active filter system is the disk separator. Disk separators often have a disk stack composed of disks that have a downwardly angled edge region and that are carried spaced apart from one another on a common rotating shaft. The rotating shaft passes through the disks in the centroid of the relevant disk, and is driven by means of an electric motor.

The rotational speed of the rotating shaft can be controlled, for example, as a function of an operating state of the internal combustion engine, in particular as a function of an internal pressure in the crankcase. In operation, the blow-by gas is conducted against the disk stack from below. In order to permit flow against a largest possible disk area, the lower and center disks have gas passages. Consequently, the blow-by gas can rise through the disk stack. The gas is driven away from the rotating shaft by the centrifugal force of the rotating disks. On account of the inertia of the oil droplets, these collect on the laterally angled edge region of the disks and are driven further outward. In this process, the small oil droplets combine into larger oil droplets. In this way, even tiny oil droplets can be filtered out of the blow-by gas. The oil droplets arriving at the side edge of the disks are flung against a baffle and, due to gravity, run downward on it into a receptacle or back into the crankcase. The blow-by gas that is cleaned of oil in this way flows past the baffle and can be mixed back into the intake air of the internal combustion engine. One such active filter system is known from DE 10 2015 205 557 B4, for example.

Such filter systems have the disadvantage that the rotational speed of the filtering device is not optimized, or is only inadequately optimized, while taking into account a filtering performance and a power consumption of the electric motor. It is fundamentally true that the filtering performance of the active filter system increases as the rotational speed increases. At the same time, an increasing rotational speed also means an increasing power consumption of the electric motor. In conventional active filter systems, the rotational speed is, at most, coupled to the internal pressure of the crankcase, so that the filter system often provides a filtering performance that is too high in operation of the internal combustion engine, and consequently has a power consumption that is too high. A power consumption that is too high can place an excessive load on both the vehicle electrical system and the battery of the motor vehicle, and furthermore reduces the efficiency of the motor vehicle.

SUMMARY OF THE INVENTION

It is therefore an object of the present invention to remedy or to at least partially remedy the above-described disadvantages for an active oil separator. In particular, it is an object of the present invention to create a method for operating an active oil separator and a device for separating oil from exhaust air of a crankcase of a motor vehicle having an internal combustion engine that avoid excessive power consumption in a simple and cost-effective manner and to ensure reliable separation of oil in doing so.

In an exemplary embodiment, a method is provided for operating an active oil separator for separating oil from exhaust air of a crankcase of a motor vehicle with an internal combustion engine, and provided is a device for separating oil from exhaust air of a crankcase of a motor vehicle with an internal combustion engine. Of course, features and details that are described in connection with the method according to the invention also apply in connection with the device according to the invention and vice versa, so mutual reference is or can always be made with regard to the disclosure of the individual aspects of the invention.

According to an example of the invention, the object is attained by a method for operating an active oil separator for separating oil from exhaust air of a crankcase of a motor vehicle with an internal combustion engine. The method has the following steps: detecting an engine operating state of the internal combustion engine by means of a detection device, wherein the engine operating state is determined by an engine load and/or an engine speed of the internal combustion engine; determining, by means of a determination device, a first SET rotational speed of the oil separator as a function of the detected engine operating state and a first characteristic map, wherein the first characteristic map specifies the first SET rotational speed of the oil separator as a function of the engine operating state; determining a maximum SET rotational speed of the oil separator as a function of the first SET rotational speed by means of the determination device in such a manner that the maximum SET rotational speed is at least as high as the first SET rotational speed; determining a preferred SET rotational speed on the basis of the maximum SET rotational speed by means of the determination device in such a manner that the preferred SET rotational speed is, at most, as large as the maximum SET rotational speed; and controlling an electric motor to drive the oil separator at the preferred SET rotational speed by means of a control device.

For the sake of simplicity, it is assumed within the scope of the invention that the speed ratio between the electric motor and the oil separator is 1:1 so that it can be left open whether the SET rotational speed is determined by means of the characteristic map for the oil separator or for the electric motor.

First, the engine operating state of the internal combustion engine is detected by means of the detection device. According to the invention, the engine operating state is determined by the engine load and/or the engine speed. Accordingly, the current engine load and/or the current engine speed preferably is determined by means of the detection device. Provision can be made within the scope of the invention that a current engine output is detected as an engine operating state. The engine operating state can be detected by, for example, determining a selected gear of a transmission of the motor vehicle, the querying of sensors designed for this purpose, in particular speed sensors, determining a fuel injection quantity, or the like. The determination of the engine operating state preferably occurs continuously, or at least is repeated continually, in order to always be able to detect a relevant, preferred SET rotational speed of the oil separator that is as current as possible.

Subsequently, the first SET rotational speed of the oil separator is determined by means of the determination device as a function of the detected engine operating state and the first characteristic map. The first characteristic map preferably is based on test series, and describes the first SET rotational speed of the oil separator to be chosen in each case for a multiplicity of engine operating states in order to ensure adequate separation of the oil from the exhaust air of the crankcase as well as operation of the electric motor that is as frugal as possible. The determination of the first SET rotational speed preferably occurs continuously, or at least is repeated continually, in order to always be able to detect a relevant, preferred SET rotational speed of the oil separator that is as current as possible.

The maximum SET rotational speed of the oil separator is determined on the basis of the first SET rotational speed and for the determination of the maximum SET rotational speed of possible additional SET rotational speeds. For the case that only the first SET rotational speed is used in this connection, the maximum SET rotational speed preferably corresponds to the first SET rotational speed. If additional SET rotational speeds are taken into account in this context, then the maximum SET rotational speed preferably corresponds to the highest SET rotational speed taken into account in this connection. The determination of the maximum SET rotational speed preferably occurs continuously, or at least is repeated continually, in order to always be able to detect a relevant, preferred SET rotational speed of the oil separator that is as current as possible.

Finally, the preferred SET rotational speed of the oil separator can be determined by means of the determination device based on the maximum SET rotational speed. For the case that no additional SET rotational speeds are to be taken into account in this connection, the preferred SET rotational speed preferably corresponds to the maximum SET rotational speed. For the case that a minimum SET rotational speed is additionally to be taken into account in this connection, the preferred SET rotational speed is, at most, as large as the minimum SET rotational speed and preferably is as close to the maximum SET rotational speed as possible here. The determination of the preferred SET rotational speed preferably occurs continuously, or at least is repeated continually, in order to always be able to use a relevant, preferred SET rotational speed that is as current as possible for controlling the electric motor.

In the simplest case of the method, in which only the engine operating state is detected, the preferred SET rotational speed preferably is determined in such a manner that the preferred SET rotational speed corresponds to the first SET rotational speed. In this case, the preferred SET rotational speed preferably is determined directly from the characteristic map while taking into account the engine operating state.

Finally, the electric motor can be controlled by means of the control device to drive the oil separator at the preferred SET rotational speed. An EC motor, which is controlled through pulse width modulation, preferably is used as the electric motor. The control preferably is adjusted for changed preferred SET rotational speeds continuously, or at least repeatedly in a continual manner, in order to always be able to ensure operation of the active oil separator that is as efficient and economical as possible.

A method according to the invention for operating an active oil separator for separating oil from exhaust air of a crankcase of a motor vehicle with an internal combustion engine has the advantage over conventional methods that efficient and economical operation of the oil separator is ensured with simple means and in a cost-effective manner. With the method according to the invention, only as much oil as necessary is separated, and the electric motor for driving the oil separator is operated as frugally as possible in doing so. In this way, energy consumption of the motor vehicle can be further reduced without it being necessary to accept a degradation of the filter result of the oil separator, so that even stringent legal requirements can still be met.

Provision can be made in a method that the engine operating state is detected by means of the detection device from an engine control unit for controlling the internal combustion engine. The internal combustion engine is controlled by means of the engine control unit. Consequently, parameters that determine the engine operating state, as for example engine load and engine speed, are available in the engine control unit and can easily be read out by means of the detection device. Direct readout of the parameters has the advantage that the engine operating state can be detected with simple means and in a cost-effective manner. Additional sensors are no longer required. Moreover, a requisite computing power of the detection device can be reduced significantly in this way.

It is preferred according to the invention that an oil temperature of the internal combustion engine is detected by means of the detection device, wherein a second SET rotational speed of the oil separator is determined by means of the determination device as a function of the detected oil temperature and a second characteristic map. The second characteristic map specifies the second SET rotational speed of the oil separator as a function of the oil temperature. In this connection, the determination of the maximum SET rotational speed of the oil separator by means of the determination device additionally takes place as a function of the second SET rotational speed in such a manner that the maximum SET rotational speed is at least as high as the second SET rotational speed. Accordingly, the maximum SET rotational speed is at least as high as the first SET rotational speed and at least as high as the second SET rotational speed. In other words, the maximum SET rotational speed is at least the maximum of the first SET rotational speed and the second SET rotational speed. For the case that no additional SET rotational speeds are to be taken into account in this connection, the maximum SET rotational speed preferably corresponds to the maximum of the first SET rotational speed and the second SET rotational speed. The determination of the second SET rotational speed preferably occurs continuously, or at least is repeated continually, in order to always be able to detect a relevant, preferred SET rotational speed that is as current as possible. The oil temperature is a decisive influence on the viscosity of the oil, and thus on the flow properties as well as the oil droplet size of the oil. The oil droplets become smaller at high oil temperatures. In order to filter out smaller oil droplets, the rotational speed of the oil separator must be raised to keep the separation performance constant. Taking the oil temperature into account has the advantage that a control of the electric motor is carried out more in line with demand and more economically with simple means and in a cost-effective manner.

Further preferred is that an oil pressure of the internal combustion engine is detected by means of the detection device, wherein a third SET rotational speed of the oil separator is determined by means of the determination device as a function of the detected oil pressure and a third characteristic map. The third characteristic map specifies the third SET rotational speed of the oil separator as a function of the oil pressure. In this connection, the determination of the maximum SET rotational speed of the oil separator by means of the determination device additionally takes place as a function of the third SET rotational speed in such a manner that the maximum SET rotational speed is at least as high as the third SET rotational speed. Accordingly, the maximum SET rotational speed is at least as high as the first SET rotational speed and at least as high as the third SET rotational speed. In other words, the maximum SET rotational speed is at least the maximum of the first SET rotational speed and the third SET rotational speed. For the case that no additional SET rotational speeds are to be taken into account in this connection, the maximum SET rotational speed preferably corresponds to the maximum of the first SET rotational speed and the third SET rotational speed. The determination of the third SET rotational speed preferably occurs continuously, or at least is repeated continually, in order to always be able to detect a relevant, preferred SET rotational speed of the oil separator that is as current as possible. The oil pressure influences an oil flow through oil nozzles for piston cooling, the oil droplet size, and an oil circulation in the crankcase. Consequently, a necessary separation performance of the oil separator can be derived from the oil pressure. As the oil pressure rises, the rotational speed of the oil separator must be raised to keep the separation performance constant. Taking the oil pressure into account has the advantage that a control of the electric motor is carried out more in line with demand and more economically with simple means and in a cost-effective manner.

Provision can be made in a method that a vehicle system voltage of a vehicle electrical system for operating the electric motor is detected by means of the detection device, wherein a fourth SET rotational speed of the oil separator is determined by means of the determination device as a function of the detected vehicle system voltage and a fourth characteristic map. The fourth characteristic map specifies the fourth SET rotational speed of the oil separator as a function of the vehicle system voltage. In this connection, the determination of the minimum SET rotational speed by means of the determination device takes place as a function of the fourth SET rotational speed in such a manner that the minimum SET rotational speed is at most as large as the fourth SET rotational speed. Moreover, the determination of the preferred SET rotational speed of the oil separator by means of the determination device additionally takes place as a function of the minimum SET rotational speed in such a manner that the preferred SET rotational speed is at most as high as the minimum SET rotational speed [sic; this probably should read " . . . at least as high as the minimum SET rotational speed"]. For the case that no additional SET rotational speeds are to be taken into account in this connection, the minimum SET rotational speed preferably corresponds to the fourth SET rotational speed. If additional SET rotational speeds are taken into account in this context, the minimum SET rotational speed preferably corresponds to the lowest SET rotational speed taken into account in this connection. The determination of the minimum SET rotational speed preferably occurs continuously, or at least is repeated continually, in order to always be able to detect a relevant, preferred SET rotational speed that is as current as possible. In the case of a relatively low vehicle system voltage, it can be advantageous to reduce a drive power of the electric motor for driving the oil separator in order to avoid overloading the vehicle electrical system. Taking the vehicle system voltage into account therefore has the advantage that the oil separator can be operated with simple means and in a cost-effective manner in such a way that overloading of the vehicle electrical system is avoided.

Further preferred is that a water content in the oil is detected by means of the detection device, wherein a fifth SET rotational speed of the oil separator is determined by means of the determination device as a function of the detected water content and a fifth characteristic map. The fifth characteristic map specifies the fifth SET rotational speed of the oil separator as a function of the water content. In this connection, the determination of the minimum SET rotational speed by means of the determination device additionally takes place as a function of the fifth SET rotational speed in such a manner that the minimum SET rotational speed is at most as large as the fifth SET rotational speed. For the case that no additional SET rotational speeds are to be taken into account in this connection, the minimum SET rotational speed preferably corresponds to the minimum of the fourth SET rotational speed and the fifth SET rotational speed. If additional SET rotational speeds are taken into account in this context, the minimum SET rotational speed preferably corresponds to the lowest SET rotational speed taken into account in this connection. The determination of the minimum SET rotational speed preferably occurs continuously, or at least is repeated continually, in order to always be able to detect a relevant, preferred SET rotational speed that is as current as possible. In the case of high quantities of water in the oil, a maximum limit is necessary. The removal of quantities of water should be promoted by a reduced separation by the oil separator. When the advantages and disadvantages are weighed, water removal has priority over oil separation. A high separation performance would cause portions of the water to liquefy again and be returned to the crankcase. Taking the water content into account therefore has the advantage that the oil separator can be operated with simple means and in a cost-effective manner in such a way that water removal is improved.

Preferably, a fuel content in the oil can be detected by means of the detection device, wherein a sixth SET rotational speed of the oil separator is determined by means of the determination device as a function of the detected fuel content and a sixth characteristic map. The sixth characteristic map specifies the sixth SET rotational speed of the oil separator as a function of the fuel content. In this connection, the determination of the minimum SET rotational speed by means of the determination device additionally takes place as a function of the sixth SET rotational speed in such a manner that the minimum SET rotational speed is at most as large as the sixth SET rotational speed. For the case that no additional SET rotational speeds are to be taken into account in this connection, the minimum SET rotational speed preferably corresponds to the minimum of the fourth SET rotational speed and the sixth SET rotational speed. If additional SET rotational speeds are taken into account in this context, the minimum SET rotational speed preferably corresponds to the lowest SET rotational speed taken into account in this connection. The determination of the minimum SET rotational speed preferably occurs continuously, or at least is repeated continually, in order to always be able to detect a relevant, preferred SET rotational speed that is as current as possible. In the case of high quantities of fuel in the oil, a maximum limit is necessary. The removal of quantities of fuel should be promoted by a reduced separation by means of the oil separator. When the advantages and disadvantages are weighed, fuel removal has priority over oil separation. A high separation performance would cause portions of the fuel to liquefy again and be returned to the crankcase. Taking the fuel content into account therefore has the advantage that the oil separator can be operated with simple means and in a cost-effective manner in such a way that fuel removal from the blow-by gas is improved.

The method can be performed repeatedly, wherein the preferred SET rotational speed is changed by means of a hysteresis only when the change exceeds a minimum change specified by the hysteresis. This has the advantage that the rotational speed of the oil separator does not have to be changed at every small change in the influence parameters, as for example engine load, engine speed, oil temperature, oil pressure, or the like. A continual acceleration and braking of the electric motor can thus be avoided with simple means and in a cost-effective manner. A negative effect of hunting of the electric motor due to the inertia of the rotor can be reduced in this way.

Especially preferably, the control of the electric motor for driving the oil separator at the preferred SET rotational speed by means of the control device takes place with a limited gradient in such a manner that a current for operating the electric motor does not exceed a predefined current limit value. This can also be referred to as gradient limiting. The dynamics of the rotational speed of the electric motor are reduced by the gradient limiting. The gradient limiting should fundamentally distinguish whether the preferred SET rotational speed increases or decreases. An application parameter for the gradient limiting preferably is to be provided for each of the two cases. The higher the gradient, the higher the current that is necessary for this purpose. With the size of the gradient limiting, the current in the event of a rotational speed change can therefore be set or limited with simple means and in a cost-effective manner. In this way, an overloading, in particular of the vehicle electrical system and/or of the electric motor, can be avoided.

According to a second aspect of the invention, the object is attained by a device for separating oil from exhaust air of a crankcase of a motor vehicle with an internal combustion engine. The device has an active oil separator with an electric motor for driving the active oil separator, a detection device for detecting operating parameters of the motor vehicle, a determination device for determining SET rotational speeds of the electric motor as a function of at least one operating parameter and at least one characteristic map, as well as a control device for controlling the electric motor as a function of a preferred SET rotational speed. According to the invention, the device is designed to carry out a method according to the invention in accordance with the first aspect of the invention.

The oil separator preferably is designed as a disk separator and preferably has a rotatably mounted shaft with a shaft longitudinal axis, on which is arranged a disk stack with multiple disks spaced apart from one another along the shaft longitudinal axis. The shaft preferably is arranged to be vertical or at least essentially vertical, and preferably runs through the centers of mass of the disks. The disks preferably have a downwardly angled edge region as well as flow passages to allow the blow-by gas to pass. The topmost disk of the disk stack preferably has no flow passages. The oil separator preferably has, adjacent to the edge regions of the disks, a baffle, in particular a circumferential baffle, for collecting the separated oil droplets. The baffle preferably is arranged to be vertical or at least essentially vertical. In further preferred fashion, the oil separator has a blow-by gas inlet for admitting the blow-by gas, an air outlet for discharging the cleaned air, and an oil outlet for draining the separated oil.

The electric motor preferably is coupled to the shaft directly or through a transmission. Preferably, the detection device is arranged outside of the oil separator. Preferably, the detection device has at least one sensor. In further preferred fashion, the at least one sensor is arranged in fluid communication with the blow-by gas inlet, in particular in the region of a blow-by gas supply line. The determination device preferably is arranged outside of the oil separator, in particular in a housing that is protected from environmental influences. Provision can be made according to the invention that the determination device is designed to be in the region of the engine control device or is designed as part of the engine control device. The control device preferably is arranged outside of the oil separator, in particular in a housing that is protected from environmental influences. Provision can be made according to the invention that the control device is designed to be in the region of the engine control device or is designed as part of the engine control device. According to the invention, the determination device and the control device can be designed as separate devices or as a common device.

All the advantages already described with respect to a method for operating an active oil separator for separating oil from exhaust air of a crankcase of a motor vehicle with an internal combustion engine according to the first aspect of the invention also arise in the device described for separating oil from exhaust air of a crankcase of a motor vehicle with an internal combustion engine. Accordingly, the device according to the invention has the advantage over conventional devices that efficient and economical operation of the oil separator can be ensured with simple means and in a cost-effective manner. With the device according to the invention, it is easily possible to separate only as much oil as necessary, and in doing so to operate the electric motor for driving the oil separator as frugally as possible. In this way, energy consumption of the motor vehicle can be reduced further without it being necessary to accept a degradation of the filter result of the oil separator, so that even stringent legal requirements can still be met.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
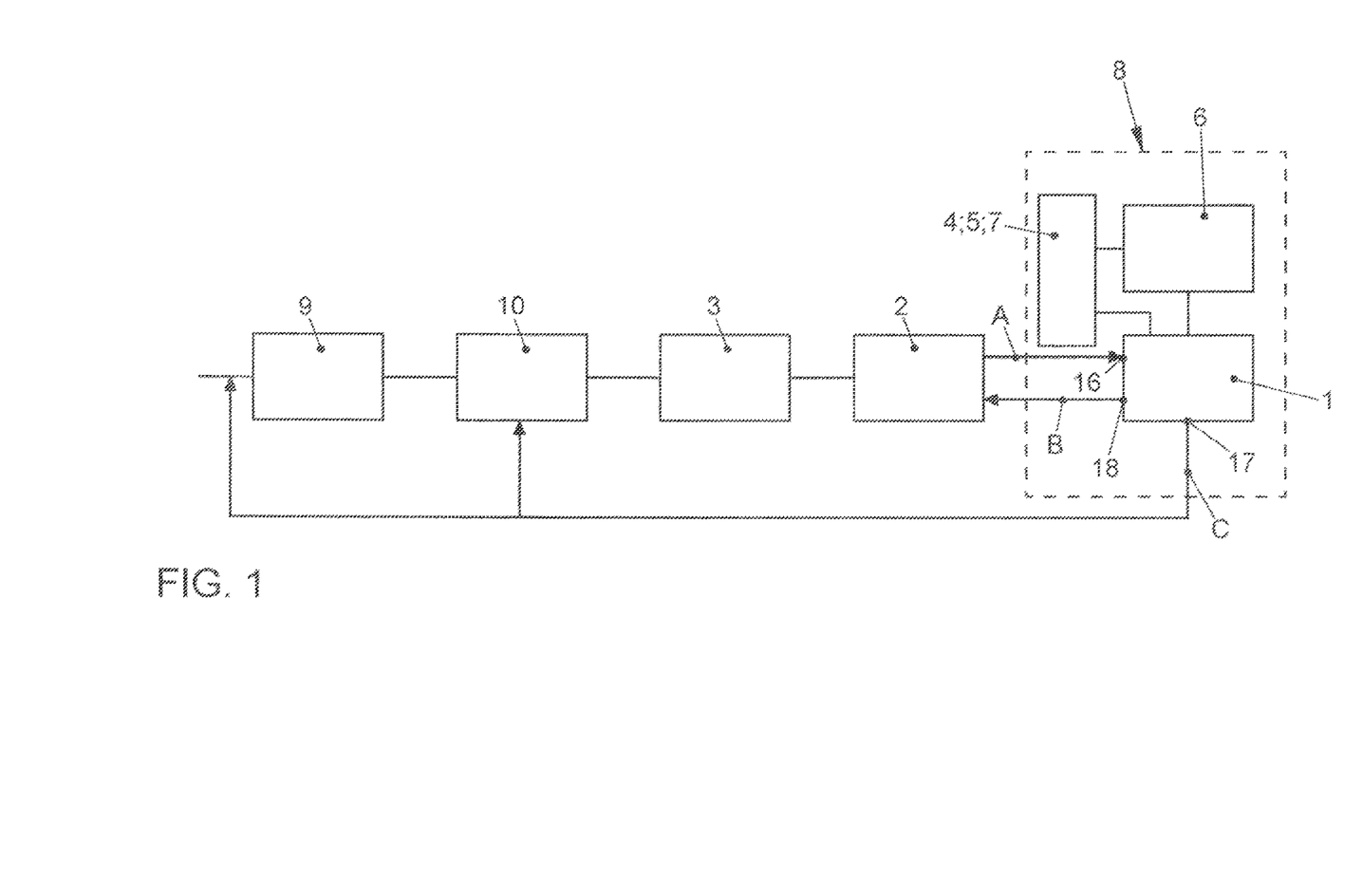
FIG. 1 shows an example of a device according to the invention in a schematic representation.

In FIG. 1, an example of a device 8 according to the invention is shown schematically. The device 8 has an oil separator 1 with an air inlet 16 for uptake of exhaust air A from a crankcase 2 of an internal combustion engine 3, an oil outlet 18 for returning an oil flow B of oil separated from the exhaust air A to the crankcase 2, as well as an air outlet 17 for removing cleaned air C. The air outlet 17 is coupled in a fluid-communicating manner to, e.g., an exhaust turbocharger 9 and/or an intake manifold 10 of an intake tract of the internal combustion engine 3. Furthermore, the device 8 has an electric motor 6 for driving the oil separator 1. In addition, the device 8 has a detection device 4, in particular for detecting an engine operating state of the internal combustion engine 3, a determination device, in particular for determining a preferred SET rotational speed SB, and a control device 7 for controlling the electric motor 6.

Figure 2:
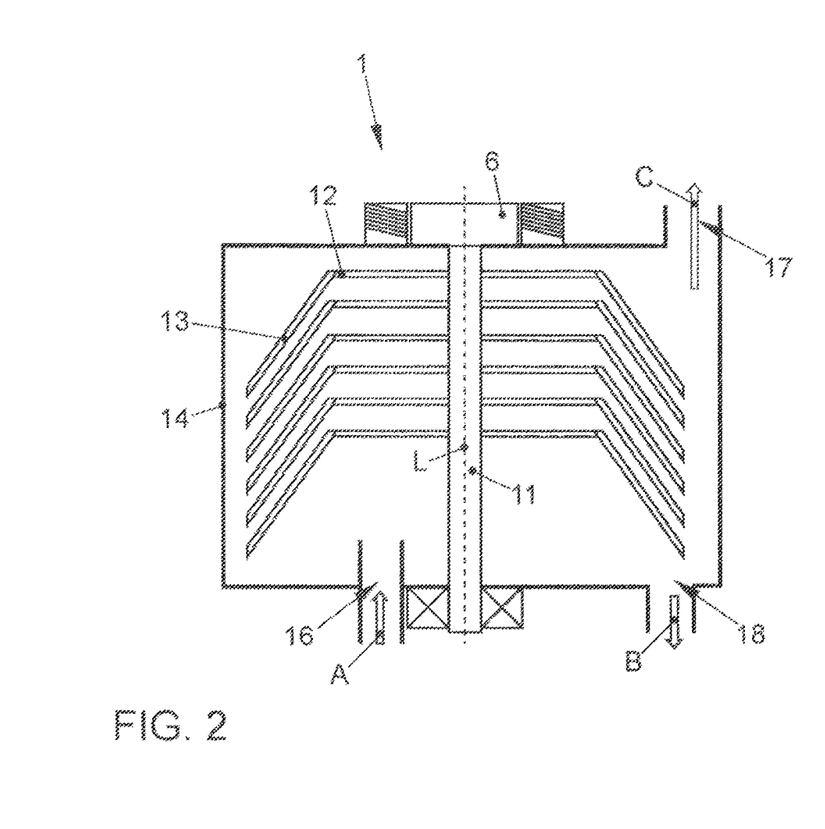
FIG. 2 shows an example of an oil separator in a sectional representation and side view.
Figure 3:
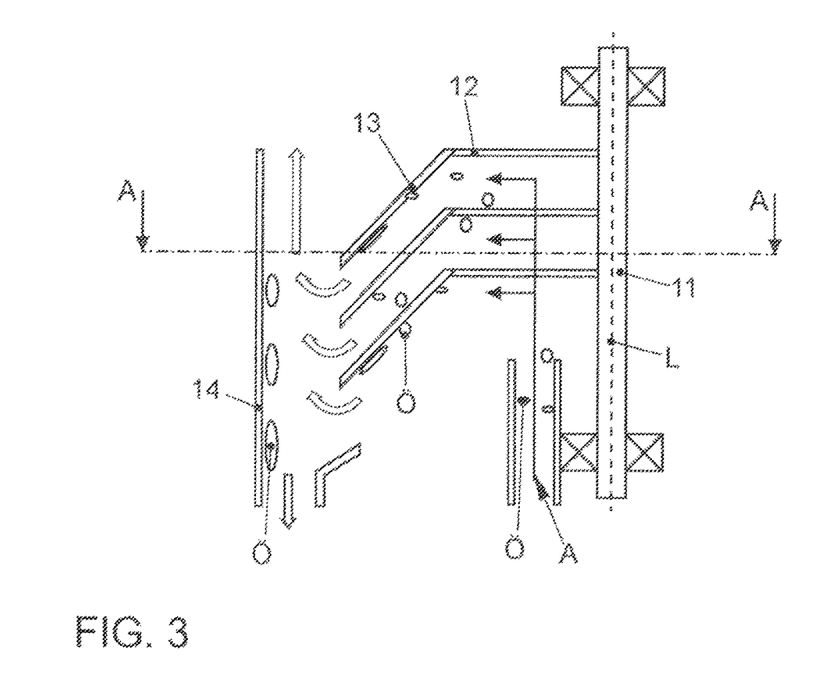
FIG. 3 shows a detail of the oil separator from FIG. 2.

FIG. 2 schematically shows an oil separator 1 of the device 8 according to the invention in a sectional representation and side view. In FIG. 3, a detail of the oil separator 1 from FIG. 2 is shown schematically in a side view. The oil separator 1 has a central shaft 11 with a shaft longitudinal axis L, on which is arranged a disk stack with a multiplicity of disks 12. The shaft 11 can be set into rotation about the shaft longitudinal axis L by means of the electric motor 6. The disks 12 are spaced apart from one another along the shaft longitudinal axis L. The shaft longitudinal axis L runs through the centers of mass of the disks 12 in order to ensure smooth operation of the oil separator 1. Edge regions 13 of the disks 12 are bent downward in order to improve a separation of the oil droplets Ö from the exhaust air A. To collect the oil droplets Ö, the oil separator 1 has a baffle 14. The cleaned air C can be conducted out of the oil separator 1 through the air outlet 17. An oil flow B can be conducted out of the oil separator 1 through the oil outlet 18.

Figure 4:
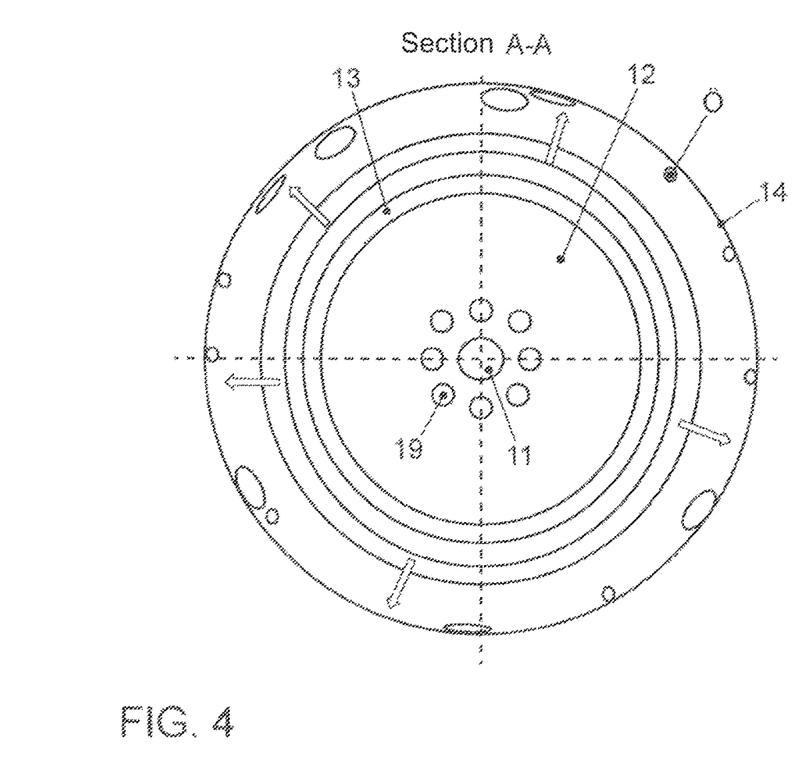
FIG. 4 shows the oil separator from FIG. 2 in a sectional representation and top view.

FIG. 4 schematically shows the oil separator 1 from FIG. 2 in a sectional representation and top view. Multiple exhaust air passages 19 that are formed in the disks 12 and that are designed to allow a portion of the exhaust air A to pass can be seen in this view. In this way, the exhaust air A can be distributed better among the individual disks 12 of the disk stack.

Figure 5:
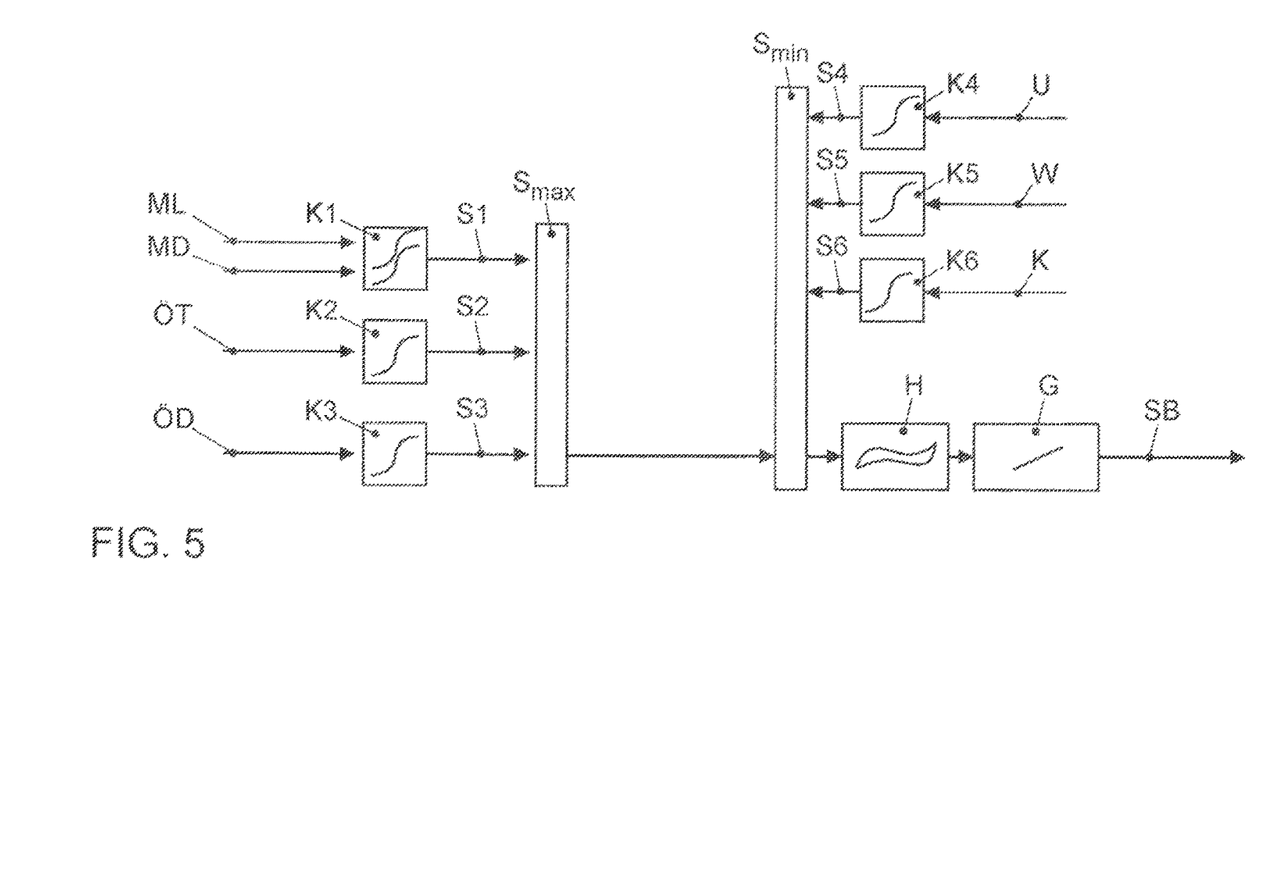
FIG. 5 shows example aspects of the method according to the invention in a schematic representation.

In FIG. 5, preferred aspects of the method according to the invention are shown schematically. As is evident from the illustration, a first SET rotational speed S1 can be detected from an engine load ML and/or an engine speed MD in conjunction with a first characteristic map K1. A second SET rotational speed S2 can be detected from an oil temperature ÖT and a second characteristic map K2. A third SET rotational speed S3 can be detected from an oil pressure ÖD and a third characteristic map K3. A maximum SET rotational speed $S_{max}$ can be detected from the first SET rotational speed S1, the second SET rotational speed S2, and the third SET rotational speed S3. A fourth SET rotational speed S4 can be detected from a vehicle system voltage U and a fourth characteristic map K4. A fifth SET rotational speed S5 can be detected from a water content W of the oil and a fifth characteristic map K5. A sixth SET rotational speed S6 can be detected from a fuel content K of the oil and a sixth characteristic map K6. A minimum SET rotational speed $S_{min}$ can be detected from the fourth SET rotational speed S4, the fifth SET rotational speed S5, and the sixth SET rotational speed S6. A preferred SET rotational speed SB for controlling the electric motor 6 can be detected from the maximum SET rotational speed $S_{max}$ and the minimum SET rotational speed $S_{min}$ by means of a hysteresis H and a gradient limiting G.

Figure 6:
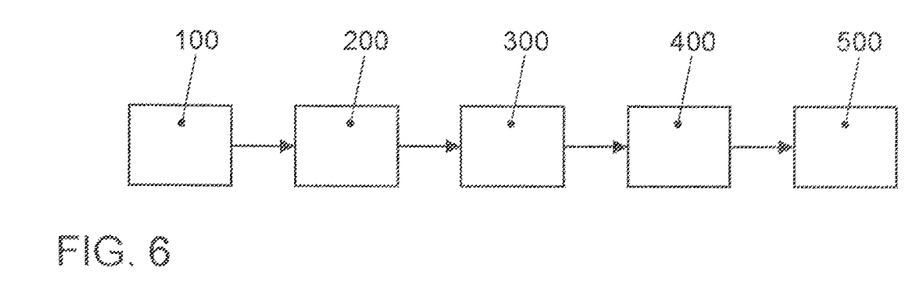
FIG. 6 shows the method according to the invention in a flow chart.

FIG. 6 schematically shows a preferred embodiment of the method according to the invention in a flow chart. In a first method step 100, an engine operating state of the internal combustion engine 3 is detected by means of the detection device 4. The engine operating state is determined by an engine load ML and/or an engine speed MD of the internal combustion engine 3. In a second method step 200, the first SET rotational speed S1 of the oil separator 1 is determined by means of the determination device 5 as a function of the detected engine operating state and the first characteristic map K1. The first characteristic map K1 specifies the first SET rotational speed S1 of the oil separator 1 as a function of the engine operating state. In a third method step 300, a maximum SET rotational speed $S_{max}$ of the oil separator 1 is determined by means of the determination device 5 as a function of the first SET rotational speed in such a manner that the maximum SET rotational speed $S_{max}$ is at least as high as the first SET rotational speed S1. In a fourth method step 400, the preferred SET rotational speed SB is determined by means of the determination device 5 on the basis of the maximum SET rotational speed $S_{max}$ in such a manner that the preferred SET rotational speed SB is, at most, as large as the maximum SET rotational speed $S_{max}$. In a fifth method step 500, the electric motor 6 is controlled at the preferred SET rotational speed SB by means of the control device 7 in order to drive the oil separator 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an active oil separator for separating oil from exhaust air of a crankcase of a motor vehicle with an internal combustion engine, the method comprising:
   detecting an engine operating state of the internal combustion engine via a detection device, the engine operating state being determined by an engine load and/or an engine speed of the internal combustion engine;
   determining, via a determination device, a first SET rotational speed of the oil separator as a function of the detected engine operating state and a first characteristic map, wherein the first characteristic map specifies the first SET rotational speed of the oil separator as a function of the engine operating state;
   determining, via the determination device, a maximum SET rotational speed of the oil separator as a function of the first SET rotational speed in such a manner that the maximum SET rotational speed is at least as high as the first SET rotational speed;
   determining, via the determination device, a preferred SET rotational speed on the basis of the maximum SET rotational speed such that the preferred SET rotational speed is, at most, as large as the maximum SET rotational speed; and
   controlling an electric motor to drive the oil separator at the preferred SET rotational speed via a control device, wherein an oil temperature of the internal combustion engine is detected via the detection device, wherein a second SET rotational speed of the oil separator is determined via the determination device as a function of the detected oil temperature and a second characteristic map, wherein the second characteristic map specifies the second SET rotational speed of the oil separator as a function of the oil temperature, wherein the determination of the maximum SET rotational speed of the oil separator via the determination device additionally takes place as a function of the second SET rotational speed such that the maximum SET rotational speed is at least as high as the second SET rotational speed.

2. The method according to claim 1, wherein the engine operating state is detected via the detection device from an engine control unit for controlling the internal combustion engine.

3. The method according to claim 1, wherein an oil pressure of the internal combustion engine is detected via the detection device, wherein a third SET rotational speed of the oil separator is determined via the determination device as a function of the detected oil pressure and a third characteristic map, wherein the third characteristic map specifies the third SET rotational speed of the oil separator as a function of the oil pressure, wherein the determination of the maximum SET rotational speed of the oil separator via the determination device additionally takes place as a function of the third SET rotational speed such that the maximum SET rotational speed is at least as high as the third SET rotational speed.

4. The method according to claim 3, wherein a vehicle system voltage of a vehicle electrical system for operating the electric motor is detected via the detection device, wherein a fourth SET rotational speed of the oil separator is determined via the determination device as a function of the detected vehicle system voltage and a fourth characteristic map, wherein the fourth characteristic map specifies the fourth SET rotational speed of the oil separator as a function of the vehicle system voltage, wherein a minimum SET rotational speed is determined via the determination device as a function of the fourth SET rotational speed such that the minimum SET rotational speed is at most as large as the fourth SET rotational speed, wherein the determination of the preferred SET rotational speed of the oil separator via the determination device additionally takes place as a function of the minimum SET rotational speed such that the preferred SET rotational speed is at most as high as the minimum SET rotational speed.

5. The method according to claim 4, wherein a water content in the oil is detected via the detection device, wherein a fifth SET rotational speed of the oil separator is determined via the determination device as a function of the detected water content and a fifth characteristic map, wherein the fifth characteristic map specifies the fifth SET rotational speed of the oil separator as a function of the water content, wherein the minimum SET rotational speed is additionally determined via the determination device as a function of the fifth SET rotational speed such that the minimum SET rotational speed is at most as large as the fifth SET rotational speed.

6. The method according to claim 5, wherein a fuel content in the oil is detected via the detection device, wherein a sixth SET rotational speed of the oil separator is determined via the determination device as a function of the detected fuel content and a sixth characteristic map, wherein the sixth characteristic map specifies the sixth SET rotational speed of the oil separator as a function of the fuel content, wherein the minimum SET rotational speed is additionally determined via the determination device as a function of the sixth SET rotational speed such that the minimum SET rotational speed is at most as large as the sixth SET rotational speed.

7. A separator for separating oil from exhaust air of a crankcase of a motor vehicle with an internal combustion engine, the separator comprising:
- an active oil separator;
- an electric motor for driving the oil separator;
- a detection device to detect operating parameters of the motor vehicle;
- a determination device to determine SET rotational speeds of the electric motor as a function of at least one operating parameter and at least one characteristic map; and
- a control device to control the electric motor as a function of a preferred SET rotational speed,
- wherein the separator is adapted to perform the method according to claim 1.

8. A method for operating an active oil separator for separating oil from exhaust air of a crankcase of a motor vehicle with an internal combustion engine, the method comprising:
- detecting an engine operating state of the internal combustion engine via a detection device, the engine operating state being determined by an engine load and/or an engine speed of the internal combustion engine;
- determining, via a determination device, a first SET rotational speed of the oil separator as a function of the detected engine operating state and a first characteristic map, wherein the first characteristic map specifies the first SET rotational speed of the oil separator as a function of the engine operating state;
- determining, via the determination device, a maximum SET rotational speed of the oil separator as a function of the first SET rotational speed in such a manner that the maximum SET rotational speed is at least as high as the first SET rotational speed;
- determining, via the determination device, a preferred SET rotational speed on the basis of the maximum SET rotational speed such that the preferred SET rotational speed is, at most, as large as the maximum SET rotational speed; and
- controlling an electric motor to drive the oil separator at the preferred SET rotational speed via a control device,
- wherein the method is performed repeatedly, and wherein the preferred SET rotational speed is changed via a hysteresis only when the change exceeds a minimum change specified by the hysteresis.

9. The method according to claim 8, wherein the control of the electric motor for driving the oil separator at the preferred SET rotational speed via the control device takes place with a limited gradient such that a current for operating the electric motor does not exceed a predefined current limit value.

* * * * *